United States Patent [19]
Mays et al.

[11] Patent Number: 5,384,770
[45] Date of Patent: Jan. 24, 1995

[54] PACKET ASSEMBLER

[75] Inventors: Richard C. Mays, Atlanta; Karen G. Hazzah, Roswell; Martin H. Sauser, Jr., Atlanta, all of Ga.

[73] Assignee: Hayes Microcomputer Products, Inc., Norcross, Ga.

[21] Appl. No.: 880,218

[22] Filed: May 8, 1992

[51] Int. Cl.⁶ .................... H04J 3/24; H04L 12/54
[52] U.S. Cl. ........................... 370/43; 370/61; 370/94.1
[58] Field of Search ........................ 370/13, 14, 16, 43, 370/60, 61, 94.1, 99, 110.1, 91, 92; 340/826, 827, 825.06; 375/7, 8

[56] References Cited

U.S. PATENT DOCUMENTS

| 4,577,314 | 3/1986 | Chu et al. | 370/94.1 |
| 4,680,773 | 7/1987 | Amundson | 375/8 |
| 4,774,706 | 9/1988 | Adams | 370/94.1 |
| 4,908,821 | 3/1990 | Sirato | 370/94.1 |
| 4,920,534 | 4/1990 | Adelmann et al. | 370/94.1 |
| 5,056,088 | 10/1991 | Price et al. | 370/94.1 |

OTHER PUBLICATIONS

CCITT Recommendation X.3 (1984) pp. 17–32.
CCITT Recommendation X.25 (1984) pp. 108–242.
CCITT Recommendation V.42bis (1990) pp. 1–27.

Primary Examiner—Alpus H. Hsu
Attorney, Agent, or Firm—Jones & Askew

[57] ABSTRACT

Method and apparatus for reducing latency delay associated with converting asynchronous, serial digital data to packet data. The number of data characters received before a time-out occurs are counted; the last character received before a time-out occurs is recognized; or the number of data characters transmitted before a signal is received from the destination terminal are counted. The information thus gathered is used to predict the occurrence of future latency delay. Data packets are transmitted immediately upon the subsequent receipt of a number of data characters equal to the number of data characters received before the time-out occurred; receipt of a character identical to the last character received before a time-out; or receipt of a number of data characters equal to the number of data characters transmitted before another signal is received from the destination terminal, respectively. By transmitting immediately when a latency delay is expected, the latency delay is completely avoided.

14 Claims, 4 Drawing Sheets

PACKET ASSEMBLER

TECHNICAL FIELD

This invention relates to the field of digital data communications systems. Specifically, it is an improved packet assembler for packetizing and transmitting data packets on digital data communication systems.

BACKGROUND OF THE INVENTION

Data communication between computers and/or terminals is frequently required in computer systems. For example, "dumb terminals" must often be connected to mainframes, or microcomputers must be interconnected. Improving the efficiency of data transmission between such devices is the field of the present invention.

The majority of data communications applications in use today transmit data in some form of bit serial format. This includes commonly used asynchronous serial data communication, such as that used between computers or terminals and modems, as well as computing devices and serial printers. The end to end format on many data communications calls between modems on the public switched telephone network is simply asynchronous serial data, end to end.

Today, many data communications links are accomplished using communications protocols employing data packets or packetized data. For example, most long distance calls to remote mainframe computers by individuals wishing to interrogate those computers are accomplished through commercial packet switch networks such as Telenet and Tymnet. In the commercial packet switch networks, local nodes are maintained at many cities. An incoming call from a modem over a local telephone subscriber link will be received by a modem at the local node of the packet switch network operator. Information transmitted over this communication length is received by the node controller and used to set up a virtual circuit within the packet switch network. For example, if a user in Atlanta is trying to communicate with a mainframe computer in San Francisco, the Atlanta user will call the local office of the commercial packet switch network. The local user transmits the information identifying the computer he or she wishes to contact in California. The packet switch network operator will, under most circumstances, already have a physical link established between Atlanta and San Francisco over which data is flowing. The node controller sets up a virtual connection between the modem upon which it is receiving the Atlanta subscriber's call and forwards this information to its San Francisco node which establishes the physical link between one of its local modems and the mainframe computer and acknowledges the existence of the virtual circuit. The virtual circuit is simply a logical connection between the modem at the Atlanta node and the modem at the San Francisco node of which both controllers are aware. Data received at the Atlanta node from the caller is assembled into packets of data which include header information identifying the virtual circuit, and the physical modem at the San Francisco node to which the data within the packet should be routed. A similar process takes place for data transmitted back from the computer in San Francisco to the user in Atlanta. In this way, a single physical link between Atlanta and San Francisco can be used to handle multiple data communications calls in an efficient manner.

Recommendation X.25 of the International Consultative Committee on Telephony and Telegraphy (CCITT) is a commonly used protocol for packet switched networks. Many modern intelligent modems, including the V series modems in effect by Hayes Microcomputer Products Inc. of Norcross, Ga., the assignee of the present invention, internally include the capability to handle X.25 calls. Thus, the modems can be provided data from multiple sources and have the capability of adding appropriate information identifying the virtual connection at the transmission end and receiving and decoding same at the receiving end in order to effect multiple virtual circuits over a single physical link between two such modems. In these cases, the data is packetized according to the protocol specified in CCITT recommendation X.25.

The International Standards Organization has defined a standard model for communication of data between and among computers and other devices. The model conceptually divides certain aspects of data communications under different layers and establishes rules for how communication of information is passed back and forth through the layers. As known to those skilled in the art, there are many applications in which collection of data is made from one layer past, according to a predetermined protocol, onto another layer, often with additional information added to the data as it is passed down to a lower layer. Thus, packets of data may be assembled at certain layers and later strung together to form a "packet of packets" as information is passed on to the next layer.

Another common application of rudimentary packetizing is found in modem error correcting intelligent modems, such as those meeting recommendation V.42 bis of the CCITT. In these modems, link access protocol M (lapM) is used to assemble small packets or frames of data which are then transmitted together as a group. The packet includes information, such as check sums, which allows the receiving modem to ascertain if an error was made in transmitting the data. If an error is detected in a given packet the remote terminal will transmit a request that the packet be resent.

It is also known to those skilled in the art that most all local area networks (LANs) used today employ some form of fixed or variable length packets when transmitting data between and among nodes on the network. Since a local area network, by its nature, requires that the various nodes be addressable in some fashion, data sent between devices is packetized and includes address headers etc., according to the protocol defining the local area network.

A packet of data is a variable number of data characters strung together to be transmitted in contiguous fashion. The data packet contains a header which proceeds the data in the packet, the data, and a footer which follows the data. The header and footer contain information, such as the number of characters in the packet, the origin and destination addresses, and error detection and correction information, which enables the receiving device to determine if the transmission was error free and where the information should go.

Whenever any data is transmitted in a packet, the packet contains a header and footer that constitute overhead for the end to end data link. Thus, if ten characters of data are transmitted in ten individual packets, these overhead bits are transmitted ten times. In contrast, if the ten characters of data are put into a single packet, the overhead bits are only transmitted once. Thus, packetizing into larger packets reduces transmission of overhead bits, which allows more data to be transmitted over the network, thereby increasing system throughput and reducing system congestion.

Of course, the above described reduction in overhead has a cost. Specifically, there is a latency delay between the time when the first characters are received by the packet assembler and the time when the data packet is transmitted. This latency delay is attributable to the delay required for accumulating data characters to form a packet. As an illustration, a packet assembler might only form a packet when ten data characters are ready to be transmitted. The packet assembler may get nine characters in fast, contiguous fashion, but then have to wait a long time to receive the tenth character. This delay incurred by waiting for the tenth character slows down communication between the user and the destination terminal.

Problems with latency delay arise principally when a terminal user is communicating with an application or interrogating the database of the mainframe through a communication link that packetizes data. This arises most commonly in communications with remote mainframes via commercial packet switch carriers while running applications on local area networks. Additionally, it can also arise when a dedicated physical link is used but the data is packetized for purposes of implementing error detection and correction.

The problem with the latency delay principally arises from the fact that most remote systems still display an indication of the typed characters on the user's terminal screen via Equiplex. Equiplex is a commonly used system in which the user will type a character intended for the remote Computing system. The character makes its way through the communication link and is processed by the remote mainframe application. The application then echoes the character back to the local terminal by sending it back for display on the terminal screen. This was originally conceived as a crude form of error detection in that many errors which took place in transmission from terminal to remote device would not be corrected on the return trip and an erroneous character would appear on the user's screen or teletype paper. It remains in use today.

If there is a large latency delay, the user has the experience of typing on the keyboard with "nothing happening." In other words, the user types but sees nothing on the screen in the way of visual feedback to indicate that his or her efforts are being received by the remote system. Inexperienced users not familiar with latency delays may start typing keys repetitively under such circumstances. When the packet is assembled and transmitted, and the return packet makes it way through the network with the echoed characters, a burst of data appears on the screen.

Thus, it is desirable to minimize latency delays to avoid user dissatisfaction and frustration. As described hereinabove, overly zealous minimizing of latency delays can lead to inefficient use of the data transmission capability of a network by sending small packets that have a high ratio of overhead bits to message bits leading to general degradation of throughput over the data communications link.

The inventors of the present invention have identified transmission of small data packets as particularly problematic in many practical local area network installations. Overall network throughput for all users is degraded seriously when one or more devices commence frequent transmission of small packets of data. The overall efficiency of the network is reduced and all users experience the network slowing down under such circumstances. A network modem that is connected directly to a local area network and onto the telephone line is a node thereon, and is an example of a device for which it is highly desirable to minimize latency delays since many common uses of a modem involve individuals sitting at terminal devices typing data and waiting for echoed characters to appear on the screen. At the same time, the slowed transmission of data often encountered in modems (vis-a-vis network bit rates) can lead to generating small inefficient packets which reduce overall message information throughput and slow down the network. It is in this environment in which the inventors of the present invention believe it will have some of its greatest utility.

Most packet assemblers do not use packet size as the sole criteria for packet assembly and transmission precisely because the unpredictable asynchronous data provided to the modem causes long delays in accumulating a packet. Many packet assemblers, therefore, use a timer to define and limit packet assembly. The timer detects asynchronous serial data characters entering the packet assembler/disassembler (PAD) from a terminal or other serial data source, and when no data enters the PAD for a pre-determined period of time a time-out signal is generated. The time-out signal triggers packeting and transmission of a packet. Thus, delays inherent in waiting for character accumulation are limited to the "time-out period."

In the ten character transmission example given earlier, the packet assembler with a timer would transmit the first nine characters as a packet if the tenth character did not arrive before the timer ran out. The tenth character would be transmitted in the subsequent packet of data. The delay normally incurred in waiting for the tenth data character is thereby shortened to what is called a "latency delay." The latency delay is equal to the time-out period.

It might seem that the time-out delay period should be very short so that data is transmitted with minimum delay. However, as discussed, systems such as the local area network (LAN) Ethernet have a multiple access topology with many users. In other words, many terminals communicate over the same network. Therefore, the systems require fast throughput of data between terminals or else the network becomes congested and file transfer performance is intolerably slow. Sending data packets too frequently causes other users access to the system to be reduced and system performance is degraded. By creating larger data packets, throughput time is decreased. To form these larger data packets, the time-out period is lengthened. However, lengthening the time-out period increases the latency delay, which reduces the terminal user's efficiency.

A fundamental problem with current packet assemblers is that the latency delay attributable to the timer is very long so that throughput can be increased by virtue of increased packet size. For instance, the time-out period is selected in increments of twentieths of a second in the communication protocol of CCITT Recommendation X.3. This long time-out helps to reduce system congestion, which is a serious problem on many local area networks, but latency delays become increasingly annoying.

Recently, some packet assemblers have been introduced that reduce latency delay. As is known to those skilled in the art, a number of modem error correcting modems will successively increase packet size upon commencement of transmission until either a predetermined or dynamically determined maximum packet size is reached. The ramp-up dynamic packet sizing system transmits consecutively larger packet sizes. For example, the first few packets transmitted increase in size from, for example, 8 characters to 16 characters to 32 characters etc. This expansion of packet size continues until a time-out occurs before a packet is transmitted. Subsequent packet transmissions again ramp-up from smaller to larger packet size. In this manner, latency delays for the first few characters are reduced. This ramping of packet size has been used in a number of intelligent modems which include error correcting capability. This type of system is particularly useful with devices such as modems where the end-to-end communication is often an interactive session between a user at a terminal and a host device at the other end. The is because, in this environment, requirement of a large number of characters in a packet would lead to the terminal user typing many characters prior to seeing any of them echoed back to his or her screen by a far end device running an echoplex protocol.

Another method of reducing latency delay is used in the CCITT Recommendation X.25 data communications protocol. The X.25 protocol uses a predetermined character recognition system to reduce latency delay. In this system, certain characters, such as a carriage return, are pre-programmed to be recognized by the packet assembler. Whenever one of the predetermined characters is encountered in the serial data stream, the packet assembler responds to the character as a designator of the end of a packet and assembles and transmits a packet immediately (CCITT X.3 § 1.4.3). The expedient of defining a predetermined character as terminated in the packet is also particularly useful in networks transmitting data in an interactive session between a user at a terminal and a remote host. For example, a user at a terminal making inquiries of a data base on a remote host normally types a line of data terminated by a carriage return in order to command the application running on the host to perform some task. Many such applications run on host computers will buffer received data until a carriage return character is received and then transfer the contents of the buffer to a command interpreter or the like in order to act on the received command. Thus, the use of a predetermined character as an indicator that the packet should be terminated and sent avoids latency delays in these circumstances.

However, if the packet assembler is part of a network that is transferring a file of binary data, assembling and transmitting the packet in response to receipt of a fixed "character" (i.e., a particular seven or eight bit pattern) can lead to reduced throughput as smaller packets are sent in response to receipt of the predetermined character. By assembling a packet and transmitting immediately when one of these predetermined characters is encountered, the latency delay inherent in waiting for the time-out signal is avoided altogether. These characters are thus used as "latency indicator signals."

The character identification system, however, still requires a priori knowledge of which characters precede a latency delay. The character identification system cannot dynamically recognize new latency indicating characters as they become apparent. Additionally, latency delays not following preidentified characters are not addressed at all.

Many currently popular file transfer protocols have characteristics of a fixed packet length and a required sequence of acknowledgement signals. For example, a number of protocols use an ACK/NACK acknowledgement sequence for a receiving device to acknowledge receipt of a packet of fixed length back to the device which sent it. Where communication is employed using such a protocol, the transmitting device will assemble and transmit a packet of fixed length. It will transmit no further data until it receives the appropriate acknowledgement from the far end device with which it is communicating. An acknowledgement signal indicates that the packet was successfully received and, to the extent that redundancy and error detection capability is included in the protocol, it was received without error. The other acknowledgement signal will indicate that a transmission error was detected. This is interpreted by the transmitting device to be a request to retransmit the last packet.

It should be remembered that such a protocol is often run end-to-end between devices which communicate through a packet switch network. In such an arrangement, the packet switch network needs to be as transparent as possible to the peculiarities of the protocol employed by the devices outside the packet switch network. When a fixed packet length ACK/NACK protocol is used, prior art packet assemblers were almost always left in a position of waiting for a time-out before the packet containing the Nth character would be forwarded to the far end device, where N is the fixed number of characters per packet. This is because the transmitting device will only send end characters until it is forced, by the rules of its protocol, to wait for the acknowledgement signal. The packet assembler is dutifully buffering up the characters waiting for what it considers to be a complete packet, or for some other event to occur which indicates that the packet should be transmitted. In most cases, this will be time-out and will thus introduce a latency delay. Once the packet is forwarded, the acknowledgement signal will be returned by the far end. Naturally, as this signal travels through the packet switch network, it is often left waiting for more characters which, under the rules of the protocol, do not come. Thus, the packet switch network is left holding only the acknowledgement character until a time-out occurs in the reverse channel which causes a high overhead, one character packet to be transmitted back to the first device. This process is then repeated.

As will be apparent from the foregoing description, the use of a fixed packet length acknowledgement based protocol on end-to-end devices, which are communicating through a network employing its own rules with respect to packet size and packet transmission often lead to a case where unnecessary and undesirable latency delays are introduced because a time-out must occur before either the last characters of a transmitted packet are sent and because a time-out is required in order to transmit the acknowledgement signal in the reverse channel.

Another means of reducing throughput time is shown in U.S. Pat. No. 4,680,773, issued to Amundson. In Amundson, packets are transmitted into a network. Whenever an error message is received from the network, the size of subsequently transmitted packets is reduced. Thus, because these smaller packets are more likely to be passed through the system error free, there is a reduction in throughput time because fewer data re-transmit requests occur. However, latency delays not associated with failed transmissions are not addressed. Thus, even in the Amundson patent the fundamental problem of latency delay remains.

A need yet exists for a method of avoiding the latency delay of time-out systems while not diminishing throughput performance.

There is a need to minimize latency delay in packet assemblers while not substantially decreasing system throughput. Thus, there is a need in the art for a packet assembler which can dynamically adapt to detected patterns in the data it is carrying in order to minimize latency delay, while, at the same time, not unduly sacrificing throughput. In particular, it is desirable to have a packet assembler for which the decision to forward a packet can be made based on criteria which are essentially independent of the end-to-end communications protocol in use. The present inventors have recognized that there is normally a fundamental tradeoff between latency delay and system throughput. Long latency delays are normally associated with larger packet sizes. The larger packet sizes make most efficient use of the network capacity by maximizing the ratio of data characters to overhead characters. As noted above, there are many applications in which latency delays are highly undesirable, particularly interactive sessions with a live user typing at a terminal. The fundamental approach of the present invention is to provide the packet assembler for which the decision to forward a packet is made based on dynamically changing criteria. The criteria established by detection of what are referred in this specification as latency indicators. A latency indicator is a signal condition within the communications network which has been found, through recent past experience, to indicate that a latency delay is likely to be the next event which follows in this particular communications path.

It is a further object of this invention to use information from prior data transfers to predict and avoid latency delays.

SUMMARY OF THE INVENTION

The current inventors first recognized and characterized the trade-off between overall network throughput speed and, on the other hand, individual user access speed to the network as determined by latency delay. The packet assembler of the present invention utilizes information generated by past data transfers to dynamically control future data transfers such that latency delays are minimized and throughput time is not significantly increased. Set forth are three embodiments for carrying out the present invention to achieve the desired result. Three different signals, one in each embodiment, are utilized to control packet assembly.

The fundamental principle underlying the several embodiments of the present packet assembler is that past data transmissions provide information which permits prediction of future latency delays. First, a pattern of events, or a particular event, which immediately precedes time-outs (latency delays) is recognized. Then, at the next occurrence of that "latency indicator signal," data is packeted immediately and transmitted. Therefore, there is no latency delay due to waiting for the time-out circuit. Further, the pattern of events discovered indicated that a time-out would have occurred after the latency indicator signal. Thus, it is usually true that the same amount of data is transmitted in the packet as would be transmitted if the assembler had waited for a time-out to occur. Therefore, even though the latency delay is avoided, the packet actually transmitted is the same size as the packet that would have been transmitted by waiting for a time-out period. Thus, throughput is usually not reduced.

A. BLOCK COUNTER USING A TIME-OUT SIGNAL

In the first embodiment of the present invention, a universal asynchronous receiver/transmitter receives (UART) serial data. Each character received by the UART causes a character interrupt signal to go high.

A timer is triggered by the character interrupt signal and is reset to its initial value in response thereto. As is standard in current packet assemblers, whenever a character is not received the packet assembler for a predetermined period of time, the timer generates a time-out signal. This time-out signal triggers formation and transmission of a packet of data.

The character interrupt signal from the UART is also input to a register as a load signal. The register thus loads each data character received by the UART. The register shifts out each data character in bit serial form to a buffer which stores the data in preparation for transmission.

The character interrupt signal also clocks a counter. Each serial data character input to the packet assembler is counted by a counter called current count. The current count is cleared every time a time-out signal occurs. Thus, a sequence of current counts are generated, each representing the total number of characters received by the packet assembler between time-out signals.

The output of the counter is input to a controller and is loaded into a register in the controller. This register can load its data into a second register in the controller. Thus, three count values are stored in the packet assembler: the two block counts associated with the two previous time-out signals are stored in the two controller registers, and the current block count is stored in the counter.

When character interrupt signal goes high, the character count in register one ("count one") is compared with the character count total in register two ("count two"). If count one and count two are equal, that number of characters is considered to be a latency indicator. The controller then detects if the characters currently being input to the packet assembler generate a current count which is equal to counts one and two. If the current count equals counts one and two, the packet assembler immediately forwards the serial data stored in the data buffer as a packet. The packet assembler predicts, based on the two prior transmissions, that no more data will be input and that a time-out delay would probably have occurred if the packet was not immediately transmitted. By transmitting immediately, the time-out delay is avoided.

When character interrupt signal goes high and count one does not equal count two and current count, the controller continues to wait for a time-out or other event before the packet is assembled and transmitted. Either a time-out signal or another character interrupt will trigger system action. The character interrupt signal from the UART causes the above discussed steps to be repeated. A time-out signal causes a data packet to be sent, and register one data to be loaded into register two. The current count is then loaded into register one. Subsequently, the current count is set to zero.

When the time-out signal goes high no latency indicator signal was discovered even though a latency delay, associated with the time-out, occurred. Thus, the controller is reset to begin looking for a new latency indicator signal.

The process of searching for two equal character block counts, as delimited by time-out signals, and then sending the next data packet if the incoming character block count (current count) equals those two prior block counts is continually repeated. When latency indicator signals are found, latency delay may be avoided altogether.

The latency delay savings introduced by not waiting for a time-out can be significant. For example, on an Ethernet system the time-out delay is conservatively set for a long time period so as to avoid transfer of short length packets which congest the network. On such a system, avoiding the time-out can mean file transfer time savings of greater than twenty percent (20%), and up to fifty percent (50%). Of equal importance, the latency delay is avoided without significant decrease in throughput. For a particular example, a file transfer protocol known as LAT employed by operating systems made by Digital Equipment Corporation employs an 80 millisecond time-out for forwarding a maximum block of 90 characters when using Kermit protocol. Use of the present invention in an intervening packetizing system between two devices running the LAT protocol has been found to reduce the time required for a file transfer by approximately 50%. It is believed by the inventors of the present invention that use of same may reduce file transfer time by up to 80% under certain circumstances.

B. DYNAMIC CHARACTER RECOGNITION

The second embodiment of the packet assembler for minimizing latency delay is an improvement on the prior art character recognition system, discussed in relation to the X.25 protocol in the Background of the Invention. This embodiment dynamically recognizes characters that precede latency delays, such as a carriage return. If any character input to the packet assembler twice precedes a time-out signal, that character is recognized as a latency indicator. Thereafter, if the same character is detected at the packet assembler input, a packet is immediately assembled and transmitted with no latency delay caused by waiting for a time-out signal. A priori knowledge of a particular applications latency inducing characters is not required because the present invention dynamically identifies and avoids time-out periods.

C. BLOCK COUNTER USING REVERSE CHANNEL INFORMATION

A third method of decreasing latency delay is achieved using still another latency indicator signal. Operation of the packet assembler is similar to the first embodiment, except that the time-out signal is replaced by a signal received by the packet assembler from the remote terminal. In the preferred embodiment, the "ACK/NACK" signal received from the remote terminal is used, however, any signal from the remote terminal could be utilized. Many data communications programs support file transfer by providing a file transfer protocol that generates handshaking signals such as ACK/NACK. The ACK/NACK signal is thus generated at the remote terminal and appears in the reverse channel. The packet assembler of the current invention detects receipt of the ACK/NACK and uses the ACK/NACK to avoid latency delays.

The system searches for two consecutive equal block counts, as delimited by the ACK/NACK signals in the reverse channel. When consecutive equal block counts are found (count one equals count two), incoming serial data is assembled as a packet immediately when current count equals count one. As discussed when referring to the first embodiment, when no latency indicator signal is found the timer controls packet assembly and transmission.

As an example of file transfer operation without the present invention, the file transfer protocol might require that after every 133rd character is transmitted, an ACK/NACK signal must be received by the transmitting local terminal. Thus, after the 133rd character arrives in the packet assembler, the packet assembler will wait for more data. However, no more data arrives because the local terminal is waiting for an ACK/NACK, so that after a latency delay the time-out signal goes high and the data is packeted and transmitted. The remote terminal gets the 133rd character, and transmits an ACK/NACK. The local terminal then resumes transmitting data to the packet assembler only when the ACK/NACK is received.

The present invention operates to detect how many characters must be transmitted by the packet assembler before an ACK/NACK is required. In the above example, when the 133rd character in the third block of 133 character enters the packet assembler, data is packetized and transmitted immediately. The latency delay due to the time-out period is avoided and throughput is not decreased.

Different application programs require ACK/NACK signals, and other control signals, at different times during file transfer. The packet assembler of the current invention can dynamically detect these patterns and use this information to avoid latency delays. In broader terms, the packet assembler dynamically adapts to different data communication protocols and monitors data in the reverse channel.

Although the third embodiment of the present invention utilizes the ACK/NACK signal, it will be obvious to those skilled in the art that other signals received from the remote terminal may be used to control packet assembly. For instance, a packet assembler might repeatedly receive data-characters from a remote terminal and then transmit a one character return signal. On subsequent transfers, the packet assembler would detect the reception of data from the remote terminal, and transmit the one character return signal as soon as the one character entered the packet assembler, without waiting for a time-out. This example simply shows that signals other than the ACK/NACK can function to trigger packet assembly.

An advantage of all the above embodiments is that latency delay is never increased. The worst case scenario in all of the above embodiments is that either the timer or another packet transmit signal will cause a data packet to be assembled and sent. Therefore, latency delay can only be reduced.

DETAILED DESCRIPTION

Referring to FIGS. 1-4, wherein like numerals represent like parts, the packet assembler of the present invention is disclosed. Three different embodiments of the packet assembler are set forth in FIGS. 1, 3 and 4. For the first embodiment, the system apparatus and connections is first set forth in FIG. 1, followed by a description of operation, as shown by the flowcharts in FIGS. 2A and 2B.

A. BLOCK COUNTER USING A TIME-OUT SIGNAL

Figure 1:
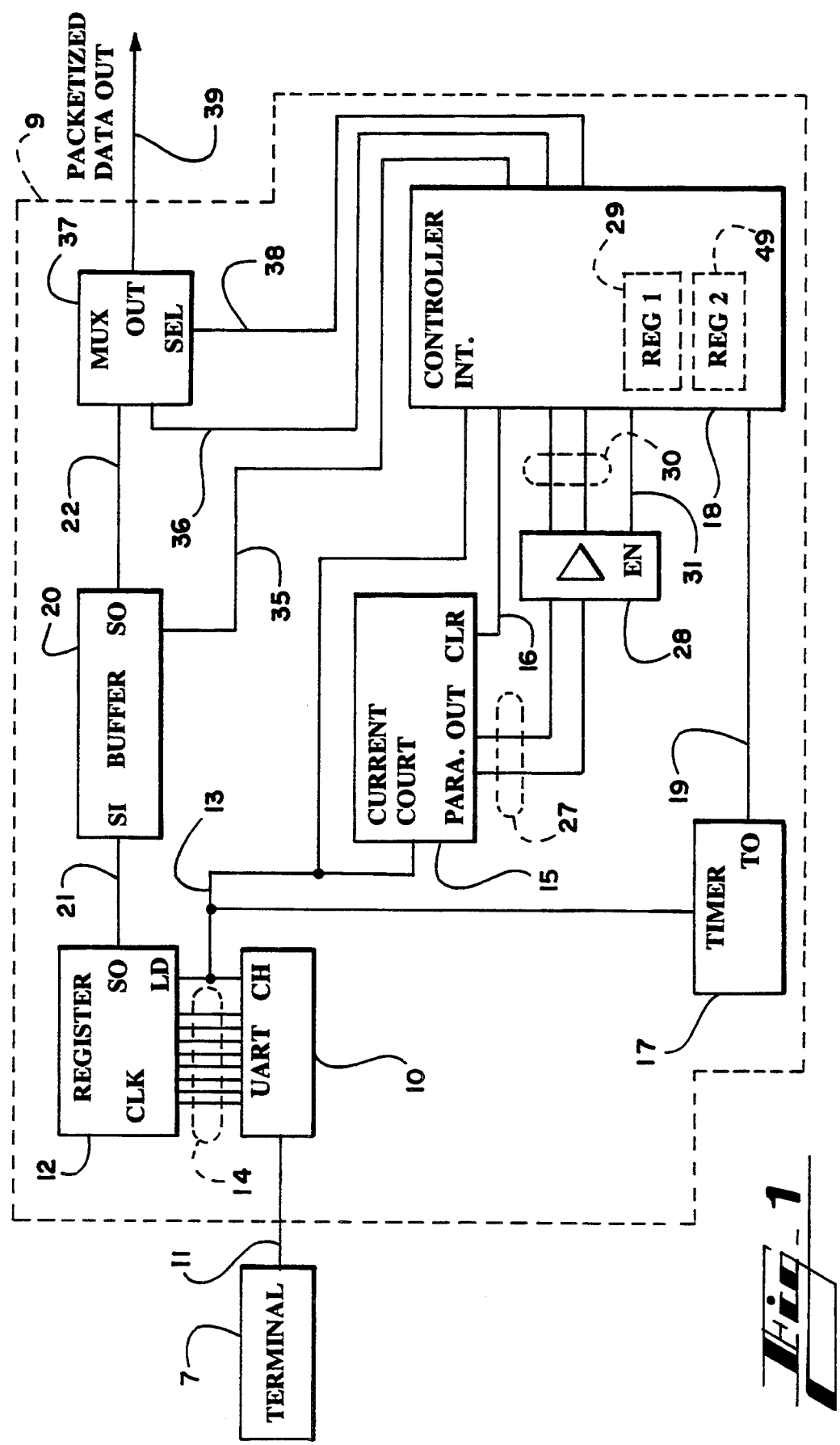
FIG. 1 is a diagram of one preferred embodiment of the present invention in its preferred environment.
Figure 2:
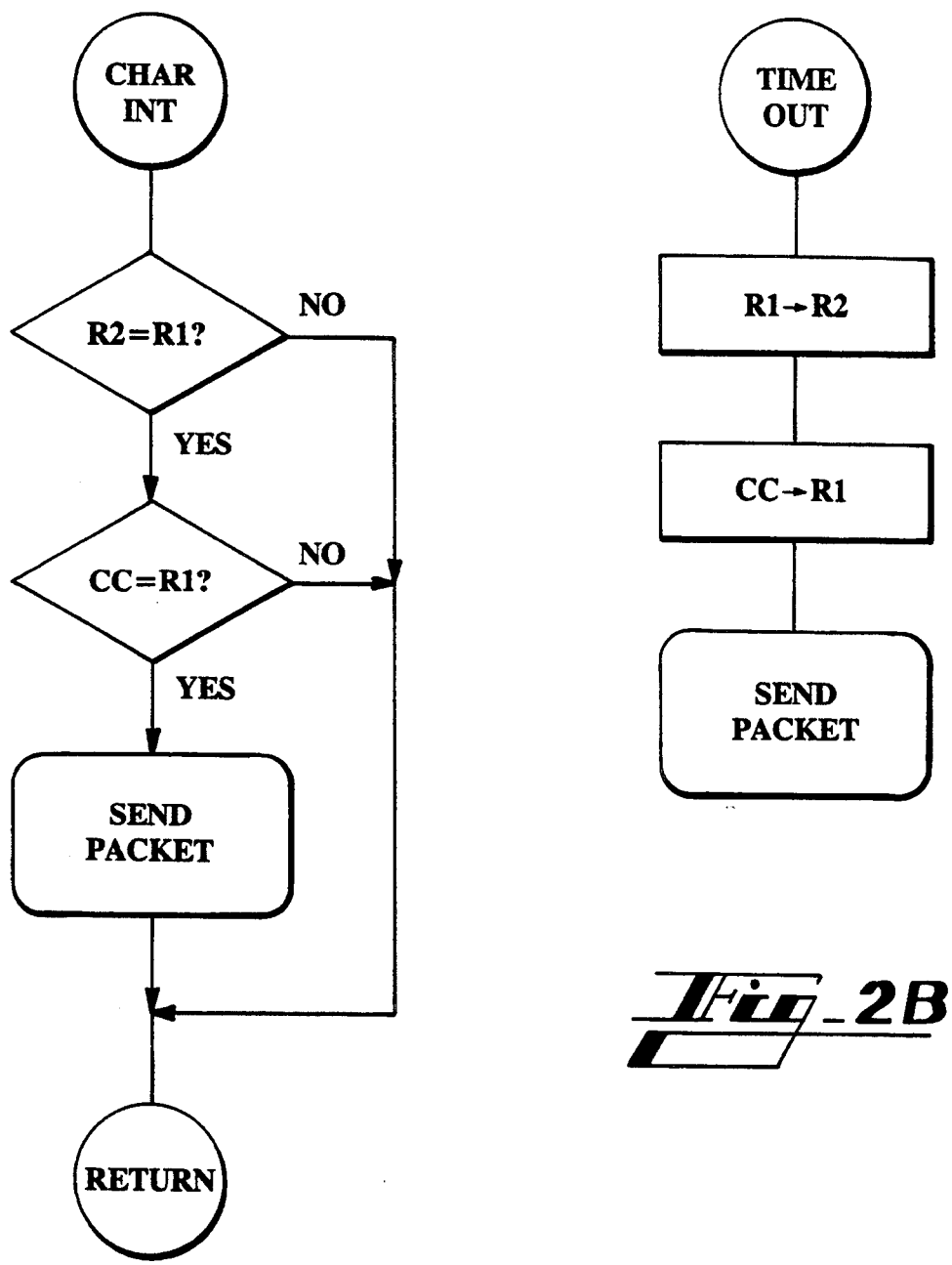
FIGS. 2A and 2B are flow charts which illustrate the functions performed by the preferred embodiment of the present invention as set forth in FIG. 1.

Referring to FIG. 1, a packet assembler 9 using a timer 17 to improve packet assembly by reducing latency delay is set forth. A terminal 7 provides serial data on line 11 to UART 10 in a packet assembler 9. Each data character entering UART 10 causes a character interrupt signal on line 13 to go high. In the preferred embodiment, serial data 11 is loaded into register 12, using character interrupt signal on line 13 as the load signal. Register 12 loads data on bus 14 when the character interrupt signal goes high. Data buffer 20 serially receives the bits of each data character on line 21. Thus, each character arriving on line 11 is stored in data buffer 20 until a packet is ready to be formed and transmitted. Data buffer 20 may be any first in/first out buffer.

Timer 17 also receives the character interrupt signal from line 13. Timer 17 counts down from a predetermined initial value to zero and produces a time-out signal on line 19 when the zero count is reached. The character interrupt signal on line 13 is also connected to timer 17 and causes timer 17 to be reset to its initial value. Therefore, time-out signal on line 19 will be set "high" only when no serial data is received from terminal 7 for a predetermined period of time equal to the time it takes for the timer 17 to count down from its initial value to zero. Naturally, a multitude of devices performing an equivalent function can embody timer 17, including one shot multi-vibrators, counters, counter timers in a microprocessor, or software timing loops.

A counter 15 maintains a current count value. It is triggered by the character interrupt signal on line 13 and thus, counts the number of characters that have been received by UART 10 since the last time counter 15 was cleared. Thus, counter 15 maintains a count of the number of asynchronous characters for which the bits have been serially shifted into buffer 20. Counter 15 may be any number of well known counters. Thus, each time a character is transmitted from terminal 7 to packet assembler 9, the current count maintained by counter 15 is incremented.

The current count output on bus 27 represents the number of characters input to packet assembler 9. The output of counter 27 is input to buffer 28, and from there is input to controller 18 on bus 30.

Controller 18 controls packet assembly and transmission. The operation of controller 18 is better understood by viewing FIG. 1 in light of the flowcharts in FIGS. 2A and 2B. The controller 18 waits for either a character interrupt signal on line 13 (serial data on input 11) or a time-out signal on line 19.

If the time-out signal on line 19 goes high, no latency indicator has been found, yet the latency delay associated with the time-out signal on line 19 occurred. An output on line 35 initiates packet output from buffer 20 (discussed in detail infra.), and controller 18 inputs information from this latest time-out to update information for detecting a new latency indicator signal. When this happens, the data in register 29 is loaded into register 49. Load current count signal on line 31 is then set high, enabling current count to be input to controller 18 on input lines 30. Current count from counter 15 is loaded into register 29. Finally, controller output 16 clears counter 15.

The above manipulation prepares controller 18 to detect a new latency indicator signal. As can be seen, the current count in counter 15 is reset by every time-out signal on line 19, so counter 15 counts the number of serial data characters 11 entering the packet assembler 9 between time-out signals on line 19. Register 29 contains the block count associated with the most recent time-out signal. Register 49 contains the block count associated with the second most recent time-out signal on line 19. The controller 18 has thereby input information from the most recent latency delays to search for a latency indicator signal.

When the character interrupt signal on line 13 goes high, the contents of register 29 are compared with the contents of register 49 (FIG. 2B). If these are equal then the controller 18 will test the current count from counter 15 to find a latency indicator signal. If the contents of registers 29 and 49 are not equal the test shown in FIG. 2A fails. Likewise, if the current counter is not equal to the count stored in register 29 (R1) the test also fails and the firmware controlling controller 18 simply returns to the routine that was interrupted by the character interrupt.

If the two tests for equality are satisfied such that the contents of the two registers, 29 and 49, are the same and equal to the current count, the packet is sent since this indicates detection of a latency indicator, i.e., that previously two successive time-outs were detected when the same number of characters had been buffered in buffer 20 to form a packet.

If the time-out signal on line 19 goes high before the current count in counter 15 equals register 29 and register 49, a latency delay occurred but no latency indicator signal was detected by controller 18. When this occurs, a packet is output immediately and the contents of register 29 are loaded into register 49. The current count is loaded into register 29 and the current count is then cleared to zero. Controller 18 is thus inputting new information to search for latency indicator signals. In this mode, the timer 17 controls packet assembly.

If the current count equals the contents of registers 29 and 49, the controller 18 has found a latency indicator signal. Controller 18 assembles and transmits a packet. Controller 18 outputs serial header information on line 36 which is multiplexed by multiplexer 37 with data from buffer 22, which is the packet data. Controller output line 35 controls the shifting of data buffer 20 and line 38 controls the multiplexing of the header and data and any footer data that may also be provided on line 36. Data output 39 provides the packet from packet assembler 9.

The above embodiment of the packet assembler thus recognizes a pattern in the number of data characters received on input 11 between time-out signals on line 19. When two equal block counts are detected, it is assumed that the next latency delay would occur after input of a block of data of equal size. By assembling and transmitting a packet immediately when the current count equals the two equal block counts, the latency delay is avoided. This predictive sequence proves correct in many instances, and latency delays can be avoided. Further, packet sizes are usually not decreased so throughput remains the same.

B. DYNAMIC CHARACTER RECOGNITION

Figure 3:
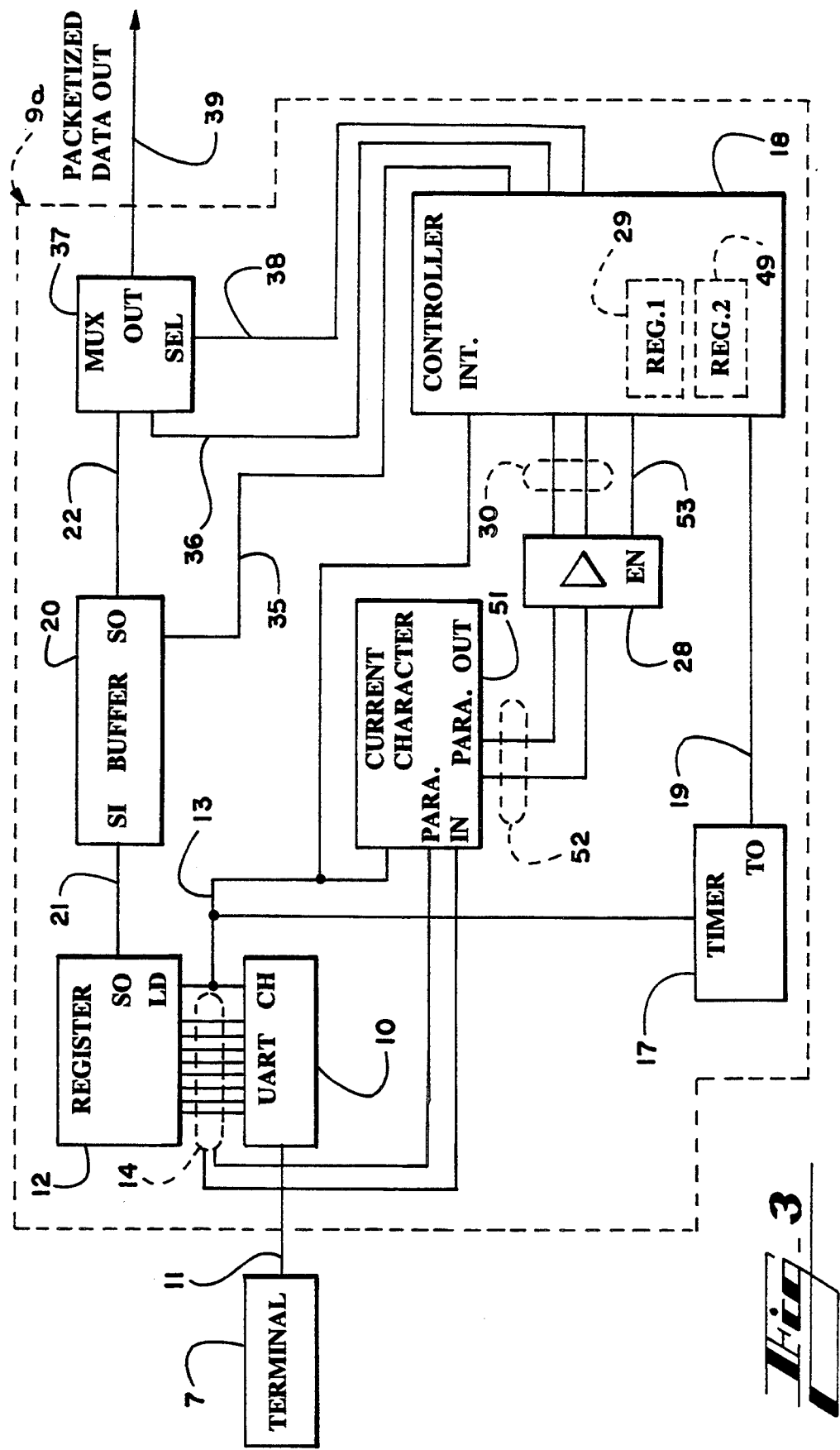
FIG. 3 is a diagram of a second preferred embodiment of the present invention in its preferred environment.

Referring to FIG. 3, a character identification scheme is used to avoid latency delays. Again, terminal 7 provides serial data on input line 11 to UART 10 in packet assembler 9a. Each data character entering UART 10 causes character interrupt signal on line 13 to go high. Serial data on line 11 is loaded into register 12 in response to the character interrupt signal on line 13. Buffer 20 serially receives each data character from line 21. Thus, each character arriving at packet assembler 9a on input line 11 is stored in buffer 20 until a packet is ready to be transmitted.

Timer 17 also receives the character interrupt signal on line 13. Timer 17 times the period between character interrupts as in the embodiment of FIG. 1.

Operation of the character recognition embodiment is similar to the block count embodiment discussed above, except that instead of using the block count between time-out signals on line 19 to predict latency delay, the controller 18 uses the last character input on line 11 before time-out signals on line 19 to predict latency delays.

Current character register 51 uses the character interrupt signal on line 13 to load each data character that enters packet assembler 9 on input line 11. Thus, register data input 14 is also provided to the current character register 51. Current character register output 52 is input to buffer 28, and input to controller 18 on lines 30.

Controller 18 controls packet assembly and transmission. The operation of controller 18 is better understood by viewing FIG. 3 in light of the flowcharts in FIGS. 2A and 2B. Controller 18 waits for either a character interrupt signal on line 13 or a time-out signal on line 19.

From inspection of the flow charts of FIGS. 2A and 2B and FIGS. 1 and 3, it will be appreciated that the comparison to find a last character latency indictor is identical to that used with the embodiment of FIG. 1 to find a character block count latency indicator. Registers 29 and 49 in the embodiment of FIG. 3 are used to store the last character received by UART 10 prior to the occurrence of a time-out. The testing for equality of the registers as shown in FIG. 2A will thus be immediately understood to test for the last character which was provided as an input rather than the number of characters that were included in the last packet. Furthermore, it will be apparent that the substitution of the current character register 51 for the current count counter 15 (FIG. 1) is the only substantive change to the embodiment of FIG. 1.

As noted hereinabove, it is known in the prior art to predefine particular characters as characters that terminate a packet, and thus cause its transmission. Naturally, in many applications the carriage return character will terminate the data in a packet and cause it to be transmitted since many applications which communicate remote via packet switch networks act on blocks of data that are terminated by carriage returns. However, the embodiment of the present invention of FIG. 3 will dynamically learn new packet terminating characters. Therefore, even when the application that is attached to the network employing the packet assembler of FIG. 3 uses different block terminating characters, the packet assembly of the present invention will detect circumstances in which the same character repeatedly appears as the last character in a packet since it precedes a time-out that causes the packet to be transmitted. Thereafter, so long as the contents of the registers are still locked onto this character, any time that character is detected, the packet will be immediately assembled and transmitted.

C. BLOCK COUNTER USING REVERSE CHANNEL INFORMATION

Figure 4:
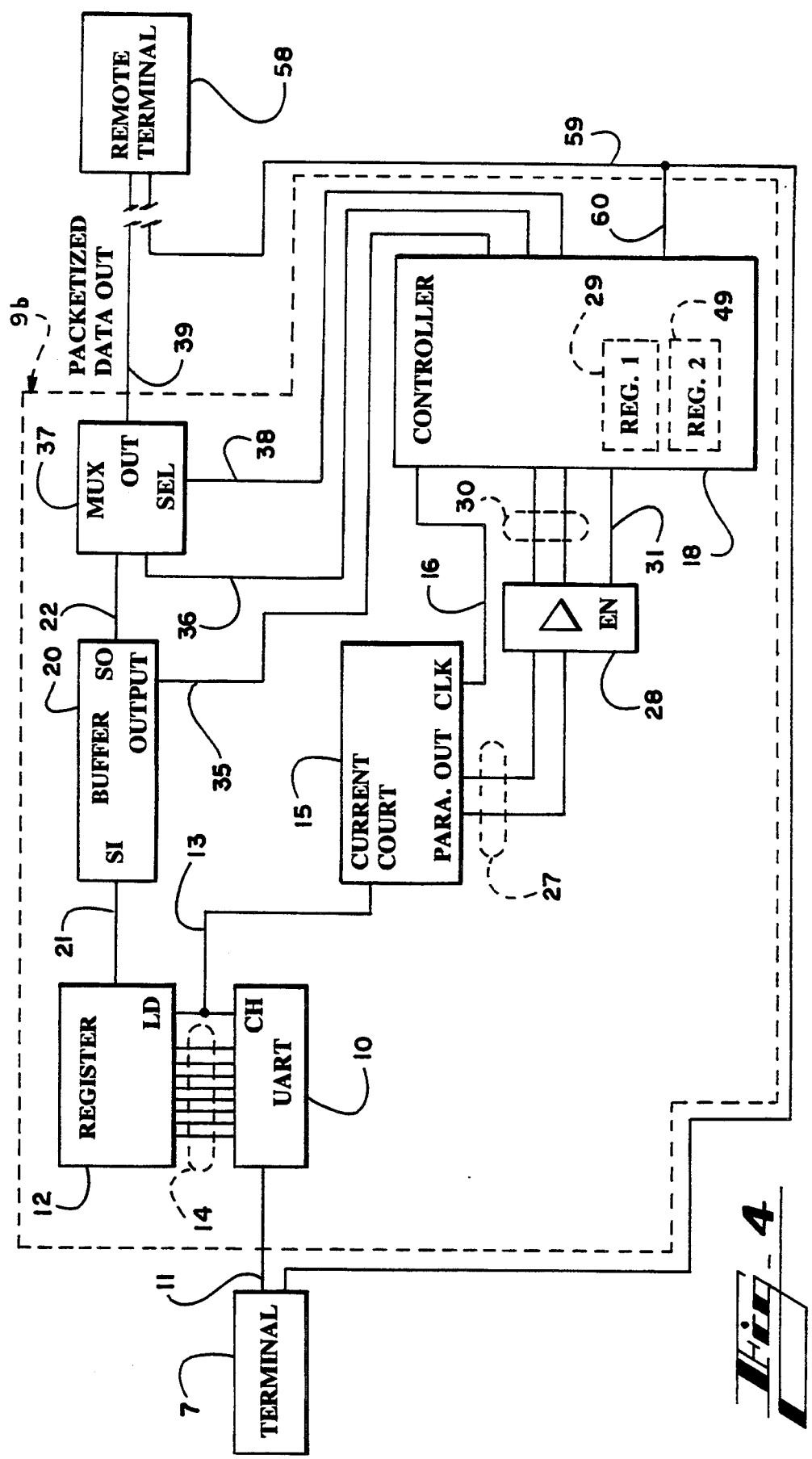
FIG. 4 is a diagram of a third preferred embodiment of the present invention in its preferred environment.

A third embodiment of the packet assembler of the present invention is set forth in FIG. 4. This embodiment utilizes data received from the remote terminal 58 to packetize data and transmit the resultant packet. In the embodiment of FIG. 4, detection of a particular signal in the reverse channel, embodied by line 59, serves a function analogous to that served by the timer in the two above described embodiments. In the preferred embodiment, the signal on line 59 that triggers packet transmission is the ACK/NACK signal generated by the application program running on remote terminal 58.

As in the previously discussed embodiments, terminal 7 provides serial data on line 11 to UART 10 in packet assembler 9. Each data character entering UART 10 causes the character interrupt signal on line 13 to go high. Serial data on line 11 is loaded into register 12 using character interrupt signal on line 13 as a load signal. Thus, each character arriving on line 11 is stored in buffer 20 until a packet is ready to be formed.

The current count in counter 15 operates as described in connection with the embodiment of FIG. 1 discussed above. Thus, each character input on line 11 is counted by counter 15. The current count output on bus 27 is the number of characters input to packet assembler 9b between ACK/NACK signals. Current count output bus 27 is input to buffer 28, and input to controller 18 on lines 30.

It should be understood that remote terminal 58 will, in most physical configurations employing the present invention, have its own packet disassembler associated with the node on the packet utilizing network to which packet assembler 9b is connected. It is diagrammatically shown in FIG. 4 to simply indicate that it receives output from line 39 and transmits data in the reverse channel of line 59. In the embodiment of FIG. 4, line 60 is tapped to line 59 so that controller 18 monitors the contents of data in the return path. It should be noted that this may be disassembled data provided, as indicated in the drawing, to an asynchronous device such as terminal 7. However, the use of an asynchronous terminal such as terminal 7 should be understood as exemplary only and not limiting of the environments in which the present invention may be used.

So far as is known to the present inventors, this is the first packet assembler that monitors reverse channel traffic in order to detect a latency indicator or make a decision as to when to assemble and transmit a packet. Since use of ACK/NACK protocols inherently lead to latency delays when this protocol is transmitted through a packet switch network, the monitoring of the back channel allows the packet assembler to avoid the latency delay that normally occurs while the assembler waits for a time-out. The time-out will always occur in the prior art because, pursuant to the rules of the protocol, terminal 7 will stop transmitting at predetermined points in its transmission sequence until it receives an acknowledgement from the remote terminal on line 59. Since the data intended for remote terminal 58 is being buffered in the packet assembler, remote terminal 58 will not receive the data that causes it to transmit the acknowledgement until a time-out occurs and the packet is transmitted.

The embodiment of FIG. 4 provides a packet assembler which avoids the inherent introduction of latency delays and thus, increases system throughput. It should be noted that it will adapt to any protocol being run by the end user applications that requires transmission of any form of acknowledgement signal after receipt of a certain number of characters.

When an ACK/NACK signal on line 59 is received by the controller 18, the data in register 29 is loaded into register 49. The load current count signal on line 31 is then set high, enabling the current count to be input to controller 18 on input lines 30. The current count is then loaded into register 29.

Generally, a time out will occur prior to receipt of an ACK/NACK signal on line 59. By determining when the ACK/NACK signal on line 59 will occur, the time-out delay can be avoided. Thus, register 29 contains the block count associated with the most recent ACK/NACK signal received on line 59 and register 49 contains the block count associated with the second most recent ACK/NACK signal. Controller 18 predicts that when the current count equals the count stored in register 29 and register 49, a latency delay will occur if a packet is not sent immediately.

The embodiment of FIG. 4 detects block counts before a particular signal is detected in the reverse channel. It should be noted that in view of the disclosure contained in this specification, the packet assemblers may be constructed which also dynamically learn the particular character in the return channel 59 that led to a particular number of characters being transmitted.

The following should be noted about the behavior of a packetizing network employing the present invention that is in the communications path between two devices employing a fixed length ACK/NACK file transfer protocol. First, it should be apparent that the three embodiments of the present invention described herein may be used singly or in any combination. If the packetizing communications link employs both the second and third embodiments described herein, latency delays are avoided in both directions in the use of this end-to-end file transfer protocol. As described immediately above, the detection of the block length by noting a latency indicator in the reverse channel causes immediate forwarding of the Nth character where a N is the block size defined by the file transfer protocol. Thus, latency delay is avoided by using the third embodiment. At the receiving end, a packet assembler employing the second embodiment will detect the acknowledgement character as a latency indicator because, when the file transfer is taking place, the single acknowledgement character is sent by the receiving device and will always be followed by a time-out. This is because the protocol requires the receiver to send only an acknowledgement signal when it receives a block and then wait for the next block.

Therefore, a second embodiment will learn to recognize the acknowledgement character as a latency indicator and immediately forward the one byte character containing the acknowledgement signal. Putting these two together, it will be seen that the packet switch network will promptly transmit the packet containing the last character of the file block in one direction because it has learned that the acknowledgement signal appears in the reverse channel after this number of characters have been sent. The packet assembler handling data from the receiving device will learn that the acknowledgement signal is the one character that always precedes a time-out and therefore will immediately forward a packet containing the acknowledgement. Thus, the system dynamically adapts to this file transfer protocol without encountering the time-outs normally associated with the use of such a file transfer protocol through a packet switched network.

As will be apparent to one skilled in the art, various components of the embodiment shown herein may be embodied by firmware implementations running on a microprocessor. For example, the functions of UARTs, buffers, and multiplexers can all be embodied in firmware by a microprocessor in a well known manner. There has been no specific disclosure of a microprocessor used to embody controller 18 as there is a very wide variety of choices, all of which are equally effective in how to implement such a device.

A commercial device employing the present invention has been created by the inventors and assignee which, as noted below, combines the functions of the first and third disclosed embodiments herein. The apparatus employs separate UARTs but otherwise implements the functions described here in firmware. In view of the nature of the present invention, the inventors believe that hardware and firmware embodiments of the apparatus and implementations of the method of the present invention are equivalents of each other.

As will be apparent to one skilled in the art, the user can vary the number of times a latency indicator signal must occur before subsequent packets are adjusted. For example, the above block count embodiment describes two consecutive equal character counts as required for triggering assembly of a subsequent equal size packet. Three or more equal character counts could be required, or the system could transmit data packets anytime the current character count equalled the character count associated with the most recent time-out signal 19. Thus, the number of events required to trigger packet assembly is left to the user's discretion. For more congested systems which need low throughput time, the number of events required to trigger packet assembly might be greater than for less congested systems. This feature provides further flexibility to the present invention.

In addition, the controller 18 can determine the existence of a latency indicator signal based on probabilities derived from the number of times the latency indicator signal preceded previous latency delays. In other words, a probabilistic determination of the likelihood of future latency delays based on information associated with previous latency delays can be made. This information can then be used to decide when packets should be transmitted.

The best mode of the current invention, built and tested by the inventors, combines the embodiments disclosed in FIGS. 1 and 4. The invention detects latency indicator characters and avoids latency delays associated with those characters, and the invention detects signal activity received from the remote terminal 58 and avoids latency delays associated with the signal activity. As will be obvious to one skilled in the art, the cumulative benefit of the separate embodiments further decreases latency delay while not decreasing throughput. Any of the above three embodiments could be combined.

Those skilled in the art will recognize that other means for producing latency indicator signals may be utilized. For example, a high resolution timer can be placed on the packet assembler input to determine the time between time-out or ACK/NACK signals, 19 and 59 respectively. However, idle time would have to be deducted from data input time so that the number of characters transferred between time-outs or ACK/NACK signals, 19 and 59, could be calculated. Because a high resolution timer would be required and such exact timing is difficult to implement, this example is not set forth as a preferred embodiment.

One skilled in the art will readily recognize that, although the present embodiments are discussed as assembling asynchronous, serial data into packets, the present invention may also be used to assemble small packets of data into larger packets. Thus, in the layer realization of a network, the present invention may be used to reduce latency delays in layer-to-layer data transfer.

While the invention has been described with reference to its preferred embodiments, variations and modifications will occur to those skilled in the art. Such variations and modifications are intended to fall within the scope of the appended claims.

We claim:

1. A packet assembler, for reducing latency delay when receiving serial data and transmitting packetized data comprising:
   a first input providing said serial data to said packet assembler;
   means for packetizing said serial data received on said first input;
   a timer for detecting each time no serial data is received on said first input for a predetermined amount of time, and thereupon generating time-out signals, said time-out signals being provided to said means for packetizing;
   means for detecting a latency indicator that precedes at least one of said time-out signals; and
   means for generating a latency indicator signal upon detection of another occurrence of said latency indicator, said latency indicator signal being provided to said means for packetizing for causing said packet assembler to assemble a packet of data in response to said latency indicator signal.

2. The packet assembler as set forth in claim 1, further including means for counting the number of characters received on said first input between occurrences of said time-out signals, means for storing said number of characters as a character count, wherein said latency indicator signal is generated when the number of characters currently being received on said first input is equal to said character count.

3. The packet assembler as set forth in claim 1, wherein said latency indicator signal is produced upon detection of a character currently being received on said first input which is identical to a character which preceded a latency delay at least once, said character which preceded said latency delay being said latency indicator.

4. The packet assembler as set forth in claim 1, further including means for counting the number of characters received on said first input between signals received from a remote terminal to which said packet assembler is transmitting, and means for storing said number of characters as a character count.

5. The packet assembler as set forth in claim 4, further including means for counting the number of characters received on said first input between occurrences of said time-out signals, wherein said latency indicator signal is produced when the number of characters currently being received on said first input is equal to said character count.

6. A packet assembler, for reducing latency delay when receiving serial data and transmitting packetized data comprising:
   a first input providing said serial data to said packet assembler;
   means for packetizing said serial data received on said first input:
   means for detecting each time no serial data is input on said first input for a predetermined amount of time, and generating a time-out signal each time no serial data is detected for said predetermined period of time, said time-out signals being provided to said means for packetizing;
   means for counting the total number of characters received on said first input between occurrences of said time-out signals, and means for storing said number of characters as a character count; and
   means for packetizing said serial data currently being received on said first input in packets of length is equal to said stored character count.

7. The packet assembler as set forth in claim 6, including means for determining when at least two consecutive equal character counts occur, and packetizing characters currently being received on said first input when the number of characters received is equal to said consecutive equal character counts.

8. A packet assembler, for reducing latency delay when receiving serial data and transmitting packetized data comprising:
   a first input providing said serial data to said packet assembler;
   means for packetizing said serial data received on said first input;
   means for generating a time-out signal each time a predetermined amount of time has passed during which no serial data has been received on said first input, said time-out signals being provided to said means for packetizing;
   means for storing a data character most recently received at said first input before each occurrence of said time-out signal; and
   means for generating a latency indicator signal when a character on said first input is identical to one of said stored characters, said latency indicator signal being utilized by said packet assembler to initiate transmitting of said packetized data.

9. The packet assembler as set forth in claim 8, further including means for determining when said time-out signals are at least twice preceded by identical characters, and wherein packetizing characters currently being received on said first input occurs when a character received on said input is identical to said identical characters.

10. A packet assembler for reducing latency delay when receiving serial data and transmitting packetized data comprising:
   a first input providing said serial data to said packet assembler;
   a second input for receiving signals from a remote terminal to which said packet assembler is transmitting said packetized data;
   means for counting the total number of characters received on said first input between reception on said second input of acknowledgment signals from said remote terminal, and means for storing said total number of characters as a character count; and
   means for packetizing characters received on said first input in packet sizes of length equal to said stored character count.

11. The packet assembler as set forth in claim 10, further including means for determining when at least two equal character counts occur between reception on said second input of consecutive occurrences of said acknowledgment signals, and packetizing characters currently being received on said first input in packets of size equal to said stored character counts.

12. A packet assembler including an input for receiving a plurality of bytes of asynchronous serial data, a first buffer connected to said input for holding said bytes of data, timing means for detecting a time-out condition upon each occurrence of the passage of a predetermined period of time during which no data is received at said input and a controller to control packetization and transmitting of the contents of said first buffer in a data packet in response thereto; the improvement comprising in combination:
   a second buffer for detecting and storing a last character value corresponding to a last character received at said input prior to a most recent occurrence of said time-out condition; and
   a comparator connected to said input for detecting another occurrence of said last character, and producing a latency detection signal in response to the detection of a character equal to said last character at said input, said latency detection signal being provided to said controller to initiate packetizing and transmission of the characters currently stored in said first buffer.

13. A packet assembler, for reducing latency delay when receiving serial data and transmitting packetized data comprising:
   a first input providing said serial data to said packet assembler;
   means for packetizing said serial data received on said first input;
   a timer that expires each time no serial data is input on said first input for a predetermined period of time, whereupon each time said timer expires a time-out signal is provided to said means for packetizing;
   a counter for counting the number of data characters within said serial data received on said first input between each time said timer expires, and means for storing said number of characters as a character count; and
   a comparator for comparing said character count to the number of characters currently being received on said first input, and in response thereto providing a latency detection signal to said means for packetizing.

14. A packet assembler for reducing latency delay when receiving serial data and transmitting packetized data comprising:
   a first input providing said serial data to said packet assembler;
   a second input for receiving signals from a remote terminal to which said packet assembler is transmitting said packetized data;
   a counter for counting the total number of characters in said serial data that are received on said first input between reception on said second input of acknowledgement signals from said remote terminal;
   a buffer for storing said total number of characters as a character count; and
   means for packetizing said serial data currently being received on said first input in packets containing a number of characters equal to said stored character count.

* * * * *